United States Patent
Chen

(10) Patent No.: US 12,481,127 B2
(45) Date of Patent: Nov. 25, 2025

(54) OPTICAL LENS, CAMERA MODULE AND ELECTRONIC DEVICE

(71) Applicant: GUANGDONG OPPO MOBILE TELECOMMUNICATIONS CORP., LTD., Guangdong (CN)

(72) Inventor: Jiawei Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 741 days.

(21) Appl. No.: 17/689,951

(22) Filed: Mar. 8, 2022

(65) Prior Publication Data

US 2022/0196972 A1  Jun. 23, 2022

Related U.S. Application Data

(63) Continuation of application No. PCT/CN2020/113494, filed on Sep. 4, 2020.

(30) Foreign Application Priority Data

Oct. 16, 2019 (CN) .......................... 201910984217.3
Oct. 16, 2019 (CN) .......................... 201921747091.X

(51) Int. Cl.
G02B 13/00 (2006.01)
G02B 9/34 (2006.01)

(52) U.S. Cl.
CPC .............. G02B 13/004 (2013.01); G02B 9/34 (2013.01)

(58) Field of Classification Search
CPC .............. G02B 9/34; G02B 9/60; G02B 9/62
See application file for complete search history.

(56) References Cited

U.S. PATENT DOCUMENTS

| 8,908,291 B1 | 12/2014 | Chung et al. | |
| 2011/0169912 A1* | 7/2011 | Abe .......................... | G02B 9/60 |
| | | | 359/717 |
| 2016/0274334 A1* | 9/2016 | Lee .......................... | G02B 9/60 |

(Continued)

FOREIGN PATENT DOCUMENTS

| CN | 102073126 | 5/2011 |
| CN | 102253470 | 11/2011 |

(Continued)

OTHER PUBLICATIONS

WIPO, International Search Report for International Application No. PCT/CN2020/113494, Nov. 30, 2020.

(Continued)

*Primary Examiner* — Sharrief I Broome
*Assistant Examiner* — Journey F Sumlar
(74) *Attorney, Agent, or Firm* — Hodgson Russ LLP

(57) ABSTRACT

The present application provides an optical lens, along an optical axis from an object side to an image side, at least includes: an aperture, a first lens having a positive refractive power, a second lens having a negative refractive power, a third lens having the positive refractive power, and a fourth lens having the negative refractive power, wherein an effective focal length f of the optical lens and an effective focal length f2 of the second lens satisfy a following relationship: |f/f2|<0.73. The present application provides a camera module and an electronic device.

15 Claims, 4 Drawing Sheets

(56) References Cited

U.S. PATENT DOCUMENTS

2017/0293124 A1* 10/2017 Kawamura .......... G02B 15/173
2018/0321456 A1* 11/2018 Chang .................. G02B 7/021

FOREIGN PATENT DOCUMENTS

| | | |
|---|---|---|
| CN | 104199179 A | 12/2014 |
| CN | 204028453 U | 12/2014 |
| CN | 206387949 | 8/2017 |
| CN | 208752288 U | 4/2019 |
| CN | 110161661 A | 8/2019 |
| CN | 110187480 A | 8/2019 |
| CN | 110737072 A | 1/2020 |
| CN | 211698374 | 10/2020 |
| JP | 2012163616 A | 8/2012 |
| JP | 2013106289 A | 5/2013 |

OTHER PUBLICATIONS

CNIPA, Second Office Action issued for Chinese Patent Application No. 201910984217.3, Feb. 6, 2025.
CNIPA, First Office Action for CN Application No. 201910984217.3, Oct. 30, 2024.

* cited by examiner

OPTICAL LENS, CAMERA MODULE AND ELECTRONIC DEVICE

CROSS REFERENCE

The present application is a continuation of International Patent Application No. PCT/CN2020/113494, filed Sep. 4, 2020, which claims priority to Chinese Patent Application No. 201921747091.X and priority to Chinese Patent Application No. 201910984217.3, each filed on Oct. 16, 2019, the entire disclosures of which are incorporated herein by reference.

TECHNICAL FIELD

The present disclosure relates to the field of optical elements, and in particular to an optical lens, a camera module and an electronic device.

BACKGROUND

As electronic devices are widely used, demands on imaging capabilities of the electronic devices are increasing. Therefore, an optical lens that can capture objects at a close range (such as a distance in millimeter) clearly is required.

SUMMARY OF THE DISCLOSURE

The present disclosure provides an optical lens, a camera module, and an electronic device, which can capture objects at a close range (such as a distance in millimeter) clearly.

Technical solutions of the present disclosure are achieved as follows.

The present disclosure provides an optical lens, along an optical axis from an object side to an image side, at least including: an aperture, a first lens having a positive refractive power, a second lens having a negative refractive power, a third lens having the positive refractive power, and a fourth lens having the negative refractive power. An effective focal length f of the optical lens and an effective focal length f2 of the second lens satisfy a following relationship: $|f/f2|<0.73$. A height H1 of an object in real and a height H2 of the object in an image captured by the optical lens satisfy a following relationship: $0.70<H2/H1<0.85$.

The present disclosure further provides a camera module, including the optical lens as described in the above and an image sensor.

The present disclosure further provides an electronic device, including the optical lens as described in the above.

DETAILED DESCRIPTION

In order to understand more details of features and technical content of embodiments of the present disclosure, embodiments of the present disclosure are described in detail below by referring to accompanying drawings. The drawings are provided for illustrative purposes only and shall not limit the embodiments of the present disclosure.

Figure 1:
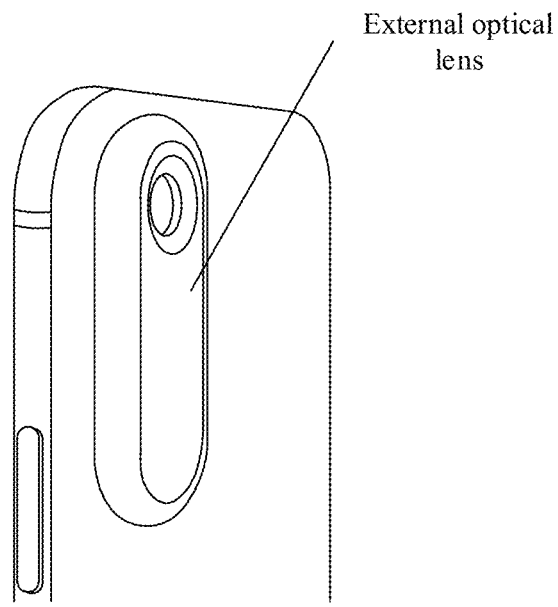
FIG. 1 is a schematic view of an external optical lens arranged at an outside of an electronic device according to an embodiment of the present disclosure.

In order to photograph an object at a distance in a millimeter range, for example, when photographing an object at a distance of less than 3 mm away from an optical lens, the optical lens inside an electronic device is unable to focus and cannot image the object at a distance in the millimeter range. However, an external optical lens may be arranged on an outside of the electronic device, and the external optical lens may be attached to a surface of a main camera lens of the electronic device, as shown in FIG. 1. However, the arrangement of the external optical lens increases a size of the electronic device, and the electronic device may not be used conveniently.

Figure 2:
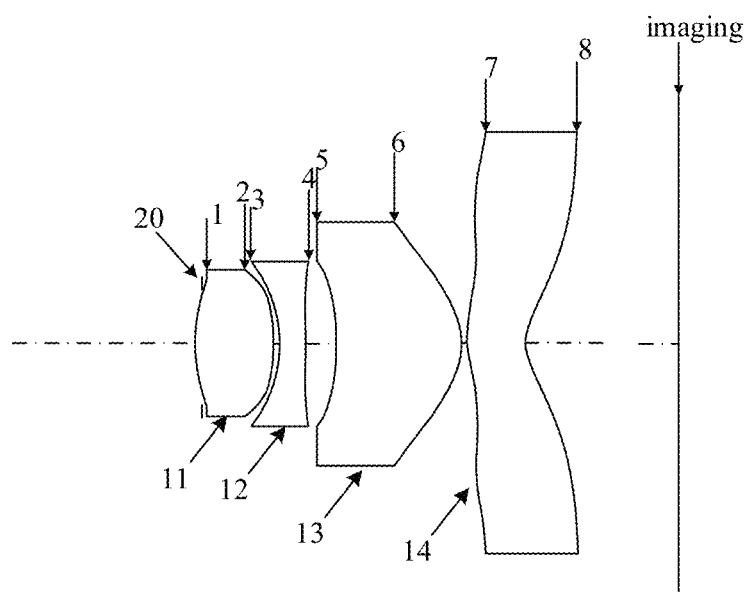
FIG. 2 is a structural schematic view of an optical lens according to an embodiment of the present disclosure.

To solve the above problem, the present disclosure provides an optical lens, a structural schematic view of the optical lens is shown in FIG. 2. Along an optical axis of the optical lens, from an object side to an image side, the optical lens includes at least: an aperture 20, a first lens 11 with a positive refractive power, a second lens 12 with a negative refractive power, a third lens 13 with the positive refractive power, and a fourth lens 14 with the negative refractive power.

In some embodiments, the first lens 11 has an object side 1 and an image side 2, and each of the object side 1 and the image side 2 is a convex surface. The second lens 12 has an object side 3 and an image side 4, and the object side 3 is a concave surface. The third lens 13 has an object side 5 and an image side 6. The object side 5 is the concave surface, and the image side 6 is the convex surface. The fourth lens 14 has an object side 7 and an image side 8. The object side 7 is the convex surface, and the image side 8 is the concave surface.

In some embodiments, an entry pupil diameter EPD of the optical lens and an effective half diameter DTg of the aperture 20 at the object side of the aperture 20 satisfy a following relationship: $EPD/DTg>1.6$, such as $EPD/DTg=2.0$.

In some embodiments, an effective focal length f of the optical lens and an effective focal length f2 of the second lens satisfy a following relationship: $|f/f2|<0.73$, such as $f/f2=-0.5$, or $f/f2=0.4$.

In some embodiments, a height H1 of the object in real and a height H2 of the object in the image captured by the optical lens satisfy a following relationship: $0.70<H2/H1<0.85$. That is, a magnification ratio of the object imaged by the optical lens is in a range of 0.70 to 0.85 times. In an implementation, the magnification ratio may be obtained by calculating a ratio of the height of the object in the image to the height of the object in real.

In some embodiments, a half diagonal length ImgH of an effective pixel area on an imaging surface of the optical lens and the effective focal length f of the optical lens satisfy a following relationship: 1.0<ImgH/f<1.6, such as ImgH/f=1.3.

In some embodiments, a radius of curvature R1 of the object side 1 of the first lens 11 and the effective focal length f1 of the first lens 11 satisfy a following relationship: 0.5<R1/f1<1.3, such as R1/f1=0.8.

In some embodiments, a thickness of a center of the first lens 11 CT1 on the optical axis, a thickness of a center of the second lens CT2 on the optical axis, and a distance from the object side of the first lens 11 to the imaging surface of the optical lens TTL on the optical axis satisfy a following relationship:

$$0.5<(CT1+CT2)/TTL*5<1.4.$$

In some embodiments, the effective pupil diameter EPD of the optical lens and the half diagonal length ImgH of the effective pixel area on the imaging surface of the optical lens satisfy a following relationship: 0.3<EPD/ImgH<0.6.

In some embodiments, the distance from the object side 1 of the first lens 11 to the imaging surface of the optical lens TTL on the optical axis and the half diagonal length ImgH of the effective pixel area on the imaging surface of the optical lens satisfy a following relationship:

$$TTL/ImgH \leq 1.6.$$

Figure 3:
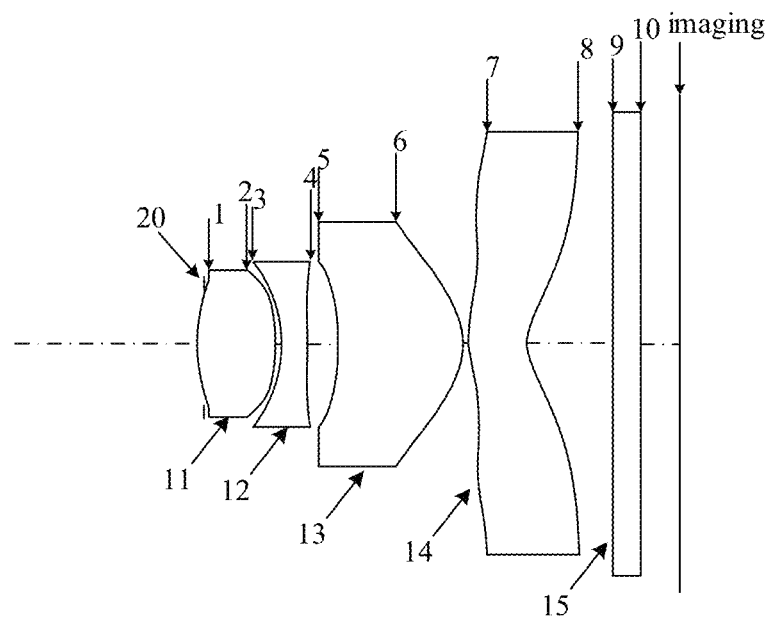
FIG. 3 is another structural schematic view of an optical lens according to an embodiment of the present disclosure.

In some embodiments, another structural schematic view of the optical lens is shown in FIG. 3. In addition to the elements described above, along the optical axis from the object side to the image side, the optical lens further includes a fifth lens 15 after the fourth lens 14. The fifth lens 15 has an object side 9 and an image side 10. The fifth lens 15 may be a filter or a glass sheet.

Basic parameters of the optical lens in the embodiments of the present disclosure are shown in Table 1 below.

| lenses | Side | Radius of curvature (mm) | distance (mm) | Refractive index (Nd) | Dispersion coefficient (Vd) | Focal length (mm) |
|---|---|---|---|---|---|---|
| Aperture | | ∞ | −0.043 | | | |
| First lens | Object side 1 | 1.123 | 0.579 | 1.536 | 55.66 | 1.069 |
| | Image side 2 | −0.960 | 0.018 | | | |
| Second lens | Object side 3 | −5.555 | 0.210 | 1.640 | 23.90 | −1.842 |
| | Image side 4 | 1.520 | 0.241 | | | |
| Third lens | Object side 5 | −1.867 | 0.934 | 1.536 | 55.66 | 1.048 |
| | Image side 6 | −0.507 | 0.020 | | | |
| Fourth lens | Object side 7 | 1.226 | 0.407 | 1.536 | 55.66 | −1.133 |
| | Image side 8 | 0.359 | 0.666 | | | |
| Fifth lens | Object side 9 | ∞ | 0.210 | 1.516 | 64.14 | |
| | Image side 10 | ∞ | 0.285 | | | |

The radius of curvature in Table 1 is a radius of curvature at an intersection between the optical axis and the object side or between the optical axis and the image side. The distance −0.043 mm in Table 1 is a distance between the aperture 20 and a vertex of the object side 1 of the first lens 11 on the optical axis. The distance 0.579 mm in Table 1 is a distance between the vertex of the object side 1 of the first lens 11 and a vertex of the image side 2 of the first lens 11. The distance 0.018 mm in Table 1 is a distance between the vertex of the image side 2 of the first lens 11 and a vertex of the object side 3 of the second lens 12 on the optical axis. Similarly, the distance 0.210 mm in Table 1 is a distance between the vertex of the object side 3 of the second lens 12 and a vertex of the image side 4 of the second lens on the optical axis. The distance 0.241 in Table 1 is a distance between the vertex of the image side 4 of the second lens 12 and a vertex of the object side 5 of the third lens 13 on the optical axis. The distance 0.934 mm in Table 1 is a distance between the vertex of the object side 5 of the third lens 13 and a vertex of the image side 6 of the third lens 13 on the optical axis. The distance 0.020 mm in Table 1 is a distance between the vertex of the image side 6 of the third lens 13 and a vertex of the object side 7 of the fourth lens 14 on the optical axis. The distance 0.407 mm in Table 1 is a distance between the vertex of the object side 7 of the fourth lens 14 and a vertex of the image side 8 of the fourth lens 14 on the optical axis. The distance 0.666 mm in Table 1 is a distance between the vertex of the image side 8 of the fourth lens 14 and a vertex of the object side 9 of the fifth lens 15 on the optical axis. The distance 0.210 in Table 1 is a distance between the vertex of the object side 9 of the fifth lens 15 and a vertex of the image side 10 of the fifth lens 15 on the optical axis. The distance 0.285 mm in Table 1 is a distance between the vertex of the image side 10 of the fifth lens 15 and imaging of the object on the optical axis.

In some embodiments of the present disclosure, each of the object side and the image side of each of the first lens 11, the second lens 12, the third lens 13 and the fourth lens 14 is non-spherical. A face shape of the non-spherical side satisfies a following equation.

$$z = \frac{ch^2}{1+[1-(k+1)c^2h^2]^{1/2}} + Ah^4 + Bh^6 + Ch^8 + Dh^{10} + Eh^{12} + Fh^{14} + Gh^{16}$$

The z is a depth of non-spherical side, that is, the distance between a point of the optical axis Y on the non-spherical side and a tangent plane perpendicular to the optical axis and passing through a vertex of the non-spherical side. The c=1/r, and the r is a radius of curvature of the surface. The h is a distance between a point on the non-spherical side and the optical axis. The k is a cone coefficient. The A is a fourth order coefficient. The B is a sixth order coefficient. The C is an eighth order coefficient. The D is a tenth order coefficient. The E is a twelfth order coefficient. The F is a fourteenth order coefficients. The G is a sixteenth order coefficient. Parameters of each non-spherical side are shown in Table 2 below.

TABLE 2

| Lens | Side | K | A | B | C | D | E | F | G |
|---|---|---|---|---|---|---|---|---|---|
| First lens | Object side 1 | −2.60E+00 | 1.00E−01 | 5.81E−02 | −1.70E+01 | 2.35E+02 | −2.10E+03 | 9.33E+03 | −1.79E+04 |
| | Image side 2 | 1.65E+00 | −7.02E−01 | 1.12E+01 | −1.09E+02 | 6.12E+02 | −2.06E+03 | 3.89E+03 | −3.13E+03 |

TABLE 2-continued

| Lens | Side | K | A | B | C | D | E | F | G |
|---|---|---|---|---|---|---|---|---|---|
| Second lens | Object side 3 | −2.85E+00 | −2.05E+00 | 1.06E+01 | −1.01E+02 | 5.97E+02 | −2.29E+03 | 5.22E+03 | −4.97E+03 |
| | Image side 4 | −3.15E−02 | −1.05E+00 | 2.01E+00 | −7.44E+00 | 2.23E+01 | −4.71E+01 | 6.25E+01 | −1.86E+01 |
| Third lens | Object side 5 | −1.21E+01 | −5.98E−02 | −3.51E−01 | −1.87E+00 | 1.44E+01 | −4.19E+01 | 4.89E+01 | −1.25E+01 |
| | Image side 6 | −2.17E+00 | 8.35E−02 | −1.27E+00 | 3.75E+00 | −6.41E+00 | 6.13E+00 | −1.30E+00 | −8.87E−01 |
| Fourth lens | Object side 7 | −1.71E+01 | −3.74E−02 | −5.29E−01 | 9.02E−01 | −6.57E−01 | 2.57E−01 | −5.31E−02 | 4.48E−03 |
| | Image side 8 | −3.13E+00 | −2.88E−01 | 2.79E−01 | −2.37E−01 | 1.51E−01 | −6.42E−02 | 1.59E−02 | −1.70E−03 |

An optical lens according to FIG. 2, Table 1 and Table 2 has an effective focal length f of 1.335 mm, a distance TTL of 3.57 mm from the object side of the first lens to the image side of the optical lens on the optical axis, a Field Of View (FOV) of 77.6 of a maximum image height, and an aperture value (f-number) of 2.8.

Tables 1 and 2 above are shown as examples only, and the parameters of the optical lens and the parameters of each non-spherical side may be suitably varied as long as meeting conditions as defined in the claims of the present disclosure.

Figure 4:
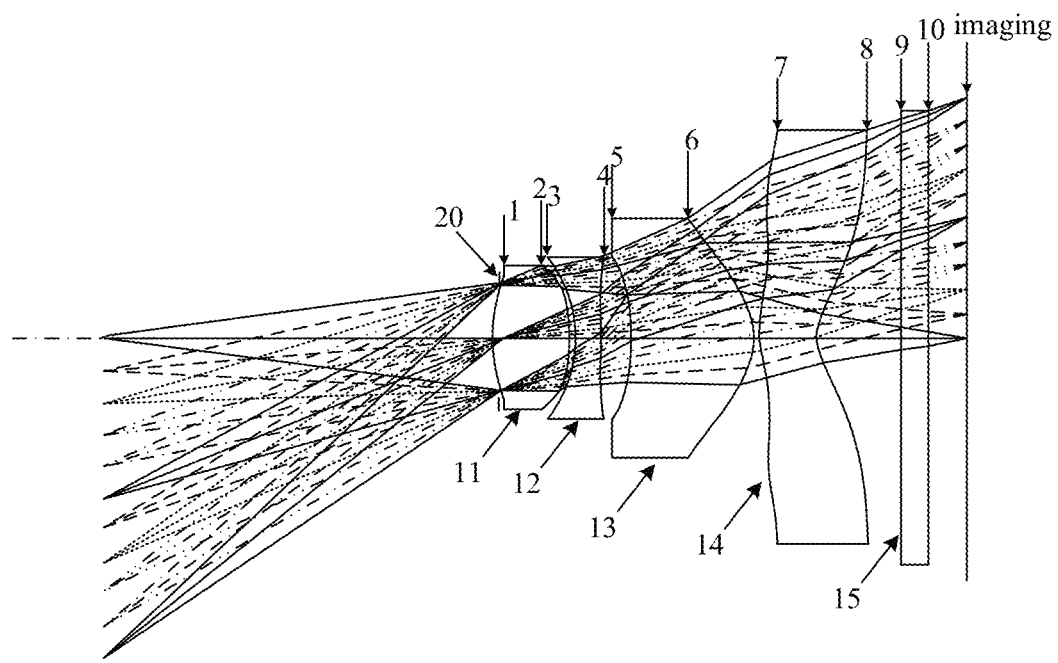
FIG. 4 is a schematic view of an optical path inside an optical lens according to an embodiment of the present disclosure where an object to be imaged is 3 mm away from the optical lens.

In an embodiment, when an object distance for imaging in the optical lens is 3 mm, a light path within the optical lens is shown in FIG. 4. The light passes sequentially through the aperture 20, the first lens 11, the second lens 12, the third lens 13, the fourth lens 14, and the fifth lens 15, and imaging may be achieved afterwards.

Figure 5:
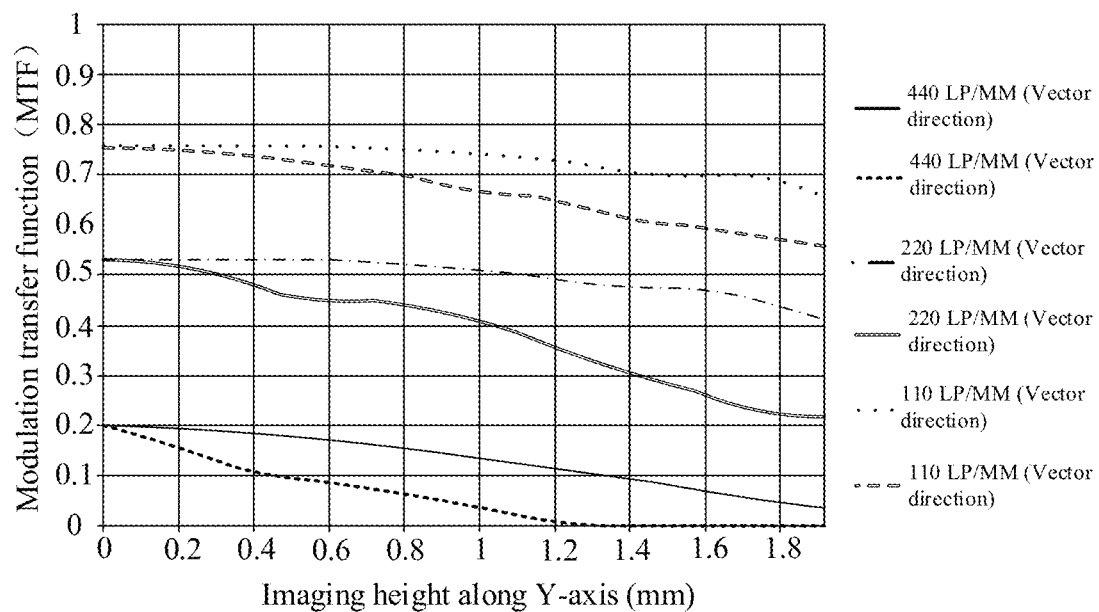
FIG. 5 is a first schematic view of optical performance of an optical lens according to an embodiment of the present disclosure.

A schematic view I of optical performance of the optical lens according to an embodiment of the present disclosure is shown in FIG. 5, which is a schematic view of a resolution power of the optical lens. The resolution power is a line pair that can be resolved per millimeter by the optical lens. As shown in FIG. 5, when an imaging height is 0.8 mm in the Y-axis, and when the resolution power of the optical lens is 110 LP/mm, the MTF is 0.7.

Figure 6:
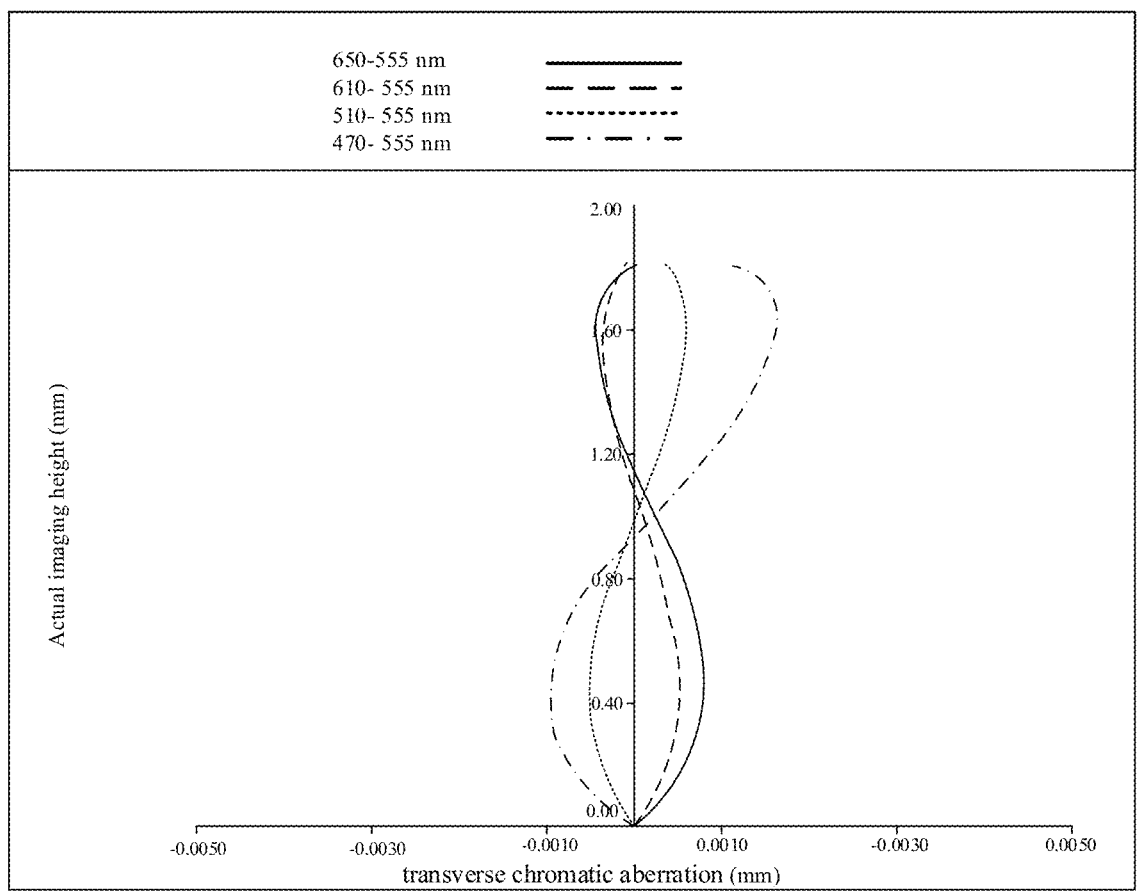
FIG. 6 is a second schematic view of optical performance of an optical lens according to an embodiment of the present disclosure.

A schematic view II of optical performance of the optical lens according to an embodiment of the present disclosure is shown in FIG. 6, which is a schematic view of transverse chromatic aberration of imaging. Light of wavelength 555 nm may be taken as a reference, transverse chromatic aberration of light in various wavelengths are shown.

Figure 7:
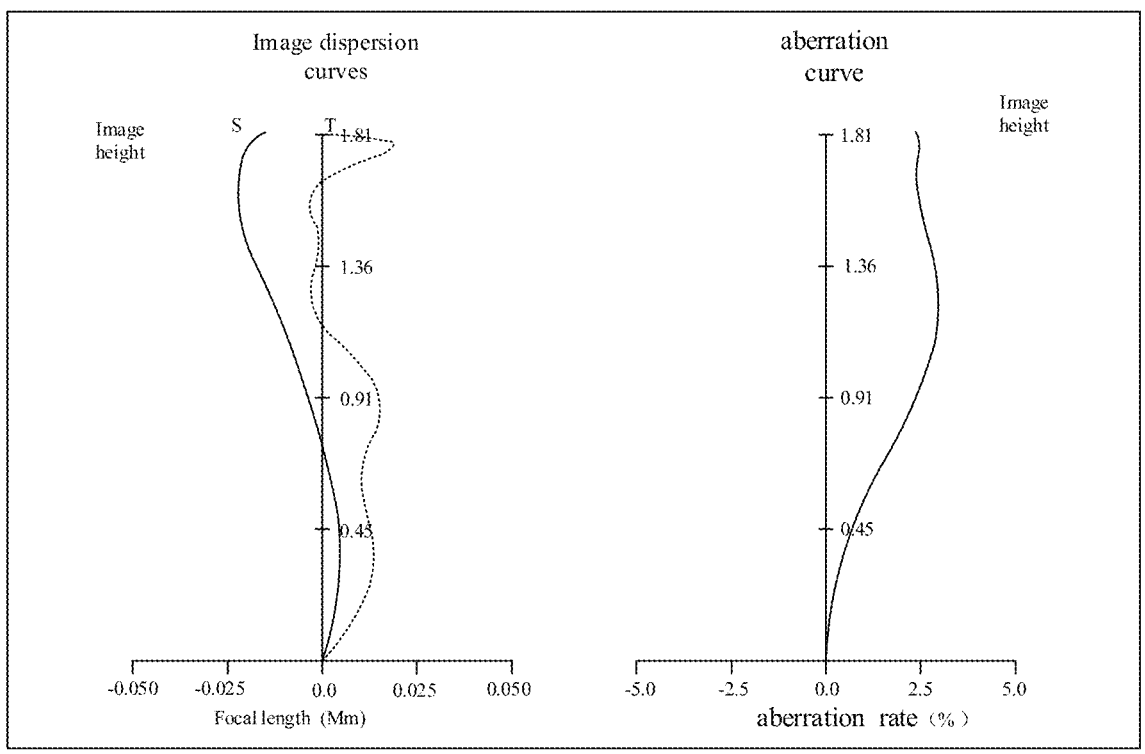
FIG. 7 is a third schematic view of optical performance of an optical lens according to an embodiment of the present disclosure.

A schematic view III of optical performance of the optical lens according to an embodiment of the present disclosure is shown in FIG. 7, which is an aberration curve of imaging. The optical lens provided by the present disclosure is disposed inside the camera module. By taking the optical lens provided by the present disclosure or taking the camera module including the optical lens provided by the present disclosure, an object at a close range, such as an object at a location of millimeter away from the camera, can be clearly imaged. In detail, an object at a distance of 3 mm away from the camera can be clearly imaged. Further, according to the optical performance shown in FIGS. 5, 6 and 7, the optical lens provided by the embodiments of the present disclosure is capable of achieving high imaging quality.

The camera module provided by the embodiments of the present disclosure may further include an image sensor in addition to the optical lens provided by the embodiments of the present application.

The present disclosure also provides an electronic device including the optical lens provided by the above embodiments of the present disclosure.

To be noted that, in the embodiments of the present disclosure, the terms of first, second, third, and the like, are used only to distinguish one feature from another, or to distinguish different elements within a same class of elements, but do not denote any limitation of the features or elements. Therefore, without departing from the teaching of the present disclosure, the first lens in the embodiments of the disclosure may also be referred to as a seventh lens, or an eighth lens, and the like.

Dimensions, thicknesses and shapes of respective lenses may be given in a broad range for illustrating and explaining the present disclosure. That is, spherical shapes or non-spherical shapes are shown in the accompanying drawings as examples only. Therefore, the spherical shapes or non-spherical shapes are not limited to the shapes shown in the accompanying drawings. The accompanying drawings are examples only and are not drawn strictly to scale.

In the embodiments of the present disclosure, the terms "includes", "has", "comprises", and "contains" used in present disclosure indicates presence of the stated features, elements, and components, but does not exclude presence or addition of one or more other features, elements, components, and/or combinations thereof. In addition, the term "at least including" used in present disclosure indicates that other features or elements may be included in addition to the at least included features or elements.

In the embodiments of the present disclosure, a surface of each lens closest to the object is called the object side of the lens, and a surface of each lens closest to the imaging surface is called the image side of the lens.

The foregoing shows specific implementation of the present disclosure only, but does not limit the scope of the present disclosure. Any variation or substitution that can be easily obtained by any skilled person in the art within the scope disclosed in the present disclosure shall be covered by the scope of the present disclosure. Accordingly, the scope of the present disclosure shall be determined by the scope of the appended claims.

What is claimed is:

1. An optical lens, configured to capture an image of an object, wherein the optical lens, along an optical axis from an object side to an image side, at least comprises: an aperture, a first lens having a positive refractive power, a second lens having a negative refractive power, a third lens having the positive refractive power, and a fourth lens having the negative refractive power, a fifth lens after the fourth lens along the optical axis from the object side to the image side, wherein an effective focal length f of the optical lens and an effective focal length f2 of the second lens satisfy a following relationship: |f/f2|<0.73; wherein each of the object side and the image side of the first lens is a convex surface; wherein the object side of the second lens is a concave surface; wherein the object side of the third lens is a concave surface, and the image side of the third lens is a convex surface; wherein the object side of the fourth lens is a convex surface, and an image side of the fourth lens is a concave surface.

2. The optical lens according to claim 1, wherein an entry pupil diameter EPD of the optical lens and an effective half diameter DTg of the aperture at the object side of the aperture satisfy a following relationship: EPD/DTg>1.6.

3. The optical lens according to claim 1, wherein a half diagonal length ImgH of an effective pixel area on an imaging surface of the optical lens and an effective focal length f of the optical lens satisfy a following relationship: 1.0<ImgH/f<1.6.

4. The optical lens according to claim 1, wherein a radius of curvature R1 of the object side of the first lens and an effective focal length f1 of the first lens satisfy a following relationship: 0.5<R1/f1<1.3.

5. The optical lens according to claim 1, wherein a thickness of a center of the first lens CT1 on the optical axis, a thickness of a center of the second lens CT2 on the optical axis, and a distance from the object side of the first lens to an imaging surface of the optical lens TTL on the optical axis satisfy a following relationship: 0.5<(CT1+CT2)/TTL*5<1.4.

6. The optical lens according to claim 1, wherein an effective pupil diameter EPD of the optical lens and a half diagonal length ImgH of an effective pixel area on an imaging surface of the optical lens satisfy a following relationship: 0.3<EPD/ImgH<0.6.

7. The optical lens according to claim 1, wherein a distance from the object side of the first lens to an imaging surface of the optical lens TTL on the optical axis and a half diagonal length ImgH of an effective pixel area on the imaging surface of the optical lens satisfy a following relationship: TTL/ImgH≤1.6.

8. A camera module, comprising an optical lens and an image sensor, wherein the optical lens is configured to capture an image of an object; and the optical lens, along an optical axis from an object side to an image side, at least comprises: an aperture, a first lens having a positive refractive power, a second lens having a negative refractive power, a third lens having the positive refractive power, and a fourth lens having the negative refractive power, a fifth lens after the fourth lens along the optical axis from the object side to the image side, wherein an effective focal length f of the optical lens and an effective focal length f2 of the second lens satisfy a following relationship: |f/f2|<0.73; wherein each of the object side and the image side of the first lens is a convex surface; wherein the object side of the second lens is a concave surface;

wherein the object side of the third lens is a concave surface, and the image side of the third lens is a convex surface; wherein the object side of the fourth lens is a convex surface, and an image side of the fourth lens is a concave surface; wherein a half diagonal length ImgH of an effective pixel area on an imaging surface of the optical lens and an effective focal length f of the optical lens satisfy a following relationship: 1.0<ImgH/f<1.6.

9. The camera module according to claim 8, wherein an entry pupil diameter EPD of the optical lens and an effective half diameter DTg of the aperture at the object side of the aperture satisfy a following relationship: EPD/DTg>1.6.

10. The camera module according to claim 8, wherein a radius of curvature R1 of the object side of the first lens and an effective focal length f1 of the first lens satisfy a following relationship: 0.5<R1/f1<1.3.

11. The camera module according to claim 8, wherein a thickness of a center of the first lens CT1 on the optical axis, a thickness of a center of the second lens CT2 on the optical axis, and a distance from the object side of the first lens to an imaging surface of the optical lens TTL on the optical axis satisfy a following relationship: 0.5<(CT1+CT2)/TTL*5<1.4.

12. The camera module according to claim 8, wherein an effective pupil diameter EPD of the optical lens and a half diagonal length ImgH of an effective pixel area on an imaging surface of the optical lens satisfy a following relationship: 0.3<EPD/ImgH<0.6.

13. The camera module according to claim 10, wherein a distance from the object side of the first lens to an imaging surface of the optical lens TTL on the optical axis and a half diagonal length ImgH of an effective pixel area on the imaging surface of the optical lens satisfy a following relationship: TTL/ImgH≤1.6.

14. The camera module according to claim 8, wherein the optical lens further comprises a fifth lens after the fourth lens along the optical axis from the object side to the image side.

15. An electronic device, comprising an optical lens, wherein the optical lens is configured to capture an image of an object; and the optical lens, along an optical axis from an object side to an image side, at least comprises: an aperture, a first lens having a positive refractive power, a second lens having a negative refractive power, a third lens having the positive refractive power, and a fourth lens having the negative refractive power, a fifth lens after the fourth lens along the optical axis from the object side to the image side, wherein each of the object side and the image side of the first lens is a convex surface; the object side of the second lens is a concave surface; the object side of the third lens is a concave surface, and the image side of the third lens is a convex surface; the object side of the fourth lens is a convex surface, and an image side of the fourth lens is a concave surface; wherein each of the object side and the image side of the first lens is a convex surface; wherein the object side of the second lens is a concave surface; wherein the object side of the third lens is a concave surface, and the image side of the third lens is a convex surface; wherein the object side of the fourth lens is a convex surface, and an image side of the fourth lens is a concave surface;

wherein an entry pupil diameter EPD of the optical lens and an effective half diameter DTg of the aperture at the object side of the aperture satisfy a following relationship: EPD/DTg>1.6.

* * * * *